United States Patent
Chiang et al.

(10) Patent No.: US 9,065,349 B2
(45) Date of Patent: Jun. 23, 2015

(54) CONTROL METHOD FOR BIDIRECTIONAL DC-DC CONVERTERS

(75) Inventors: Wen-Jung Chiang, Kaohsiung (TW); Jen-Chieh Chang, Kaohsiung (TW); Hung-Tien Chen, Kaohsiung (TW); Yu-Ting Kuo, Kaohsiung (TW)

(73) Assignee: Ablerex Electronics Co., Ltd., New Taipei (TW)

( * ) Notice: Subject to any disclaimer, the term of this patent is extended or adjusted under 35 U.S.C. 154(b) by 254 days.

(21) Appl. No.: 13/590,247

(22) Filed: Aug. 21, 2012

(65) Prior Publication Data
US 2014/0009972 A1    Jan. 9, 2014

(30) Foreign Application Priority Data

Jul. 3, 2012  (TW) .............................. 101123941 A

(51) Int. Cl.
$H02M\ 3/335$  (2006.01)
$H02M\ 3/337$  (2006.01)
$H02M\ 1/00$  (2007.01)

(52) U.S. Cl.
CPC .......... *H02M 3/33584* (2013.01); *H02M 3/337* (2013.01); *H02M 2001/0058* (2013.01); *Y02B 70/1491* (2013.01)

(58) Field of Classification Search
CPC ......... H02M 3/335; H02M 7/66; H02M 7/68; H02M 7/575; H02M 2001/0054; H02M 2001/34; H02M 2001/342; H02M 2001/344; H02M 2001/346; H02M 2001/348; H02M 2001/38
USPC .............. 363/15–17, 50, 56.01, 56.02, 56.05, 363/56.08, 56.11, 56.12
See application file for complete search history.

(56) References Cited

U.S. PATENT DOCUMENTS

| | | | | |
|---|---|---|---|---|
| 5,956,245 | A * | 9/1999 | Rozman | 363/89 |
| 6,452,815 | B1 * | 9/2002 | Zhu et al. | 363/17 |
| 6,587,356 | B2 * | 7/2003 | Zhu et al. | 363/17 |
| 6,876,556 | B2 * | 4/2005 | Zhu et al. | 363/17 |
| 7,339,287 | B2 * | 3/2008 | Jepsen et al. | 307/82 |
| 7,859,861 | B2 * | 12/2010 | Taurand et al. | 363/17 |
| 8,611,107 | B2 * | 12/2013 | Chapman et al. | 363/21.04 |
| 2002/0159280 | A1 * | 10/2002 | Zhu et al. | 363/98 |
| 2003/0002304 | A1 * | 1/2003 | Zhu et al. | 363/56.02 |
| 2009/0059622 | A1 | 3/2009 | Shimada et al. | |
| 2012/0098341 | A1 | 4/2012 | Shimada et al. | |
| 2012/0250359 | A1 * | 10/2012 | Knill | 363/17 |
| 2013/0272032 | A1 * | 10/2013 | Mueller et al. | 363/17 |

* cited by examiner

*Primary Examiner* — Gary L Laxton
*Assistant Examiner* — Kyle J Moody
(74) *Attorney, Agent, or Firm* — Alan D. Kamrath; Kamrath IP Lawfirm, P.A.

(57) ABSTRACT

A control method for bidirectional DC-DC converter includes: operating a bidirectional DC-DC converter having a low voltage side including a plurality of low-voltage-side switches, a voltage clamping switch and a voltage clamping capacitor, and a high voltage side including a plurality of high-voltage-side switches in a boost mode; switching the voltage clamping switch with a predetermined duty cycle prior to switching on all of the low-voltage-side switches; adjusting the predetermined duty cycle of the voltage clamping switch to be smaller than a turn-off interval of the low-voltage-side switches to reduce the conduction loss of the low-voltage-side switches and the voltage clamping switch; alternatively, operating the DC-DC converter in a buck mode; and adjusting and extending the duty cycle of the low-voltage-side switches to overlap a turn-off time of the high-voltage-side switches to reduce the conduction loss of the low-voltage-side switches.

17 Claims, 5 Drawing Sheets

CONTROL METHOD FOR BIDIRECTIONAL DC-DC CONVERTERS

BACKGROUND OF THE INVENTION

1. Field of the Invention

The present invention relates to a control method for bidirectional DC-DC converters. More particularly, the present invention relates to the control method for bidirectional DC-DC converters for enhancing the power conversion efficiency.

2. Description of the Related Art

U.S. Patent Pub. No. 20090059622, entitled "Bi-directional DC-DC Converter and Method for Controlling the Same," discloses a bi-directional DC-DC converter having a transformer for connecting a voltage type full bridge circuit connected to a first power source and a current type switching circuit connected to a second power source. A voltage clamping circuit constructed by switching elements and a clamping capacitor are connected to the current type switching circuit. The converter has a control circuit for cooperatively making the switching elements operative to control a current flowing in a resonance reactor.

Another U.S. Patent Pub. No. 20120098341, entitled "Bidirectional DC-DC Converter and Control Method Thereof," discloses a small-size, high-efficiency, isolated, bidirectional DC-DC converter. The bidirectional DC-DC converter includes a transformer in which windings are magnetically coupled, switching circuits, a diode connected in parallel with a switch, smoothing capacitors, and a control section. The first and second DC power supplies, which are connected in parallel with the smoothing capacitors, respectively, provide bidirectional electrical power transfer. When electrical power is to be transferred from the first DC power supply to the second DC power supply, the switch is maintained in the ON state. When, on the other hand, electrical power is to be transferred from the second DC power supply to the first DC power supply, the switch is maintained in the OFF state to prevent a reverse electrical power flow from the first DC power supply.

However, there is a need of improving the control method for bidirectional DC-DC converters disclosed in U.S. Patent Pub. No. 20090059622 and U.S. Patent Pub. No. 20120098341 for enhancing the power conversion efficiency and reducing the manufacturing cost. The above-mentioned patent publications are incorporated herein by reference for purposes including, but not limited to, indicating the background of the present invention and illustrating the state of the art.

As is described in greater detail below, the present invention provides a control method for bidirectional DC-DC converters. When the bidirectional DC-DC converter is operated, a boost mode or a buck mode of the bidirectional DC-DC converter is adjusted to reduce power loss in such a way to mitigate and overcome the above problems.

SUMMARY OF THE INVENTION

The primary objective of this invention is to provide a control method for bidirectional DC-DC converters. The bidirectional DC-DC converter includes a high voltage side and a low voltage side. When the bidirectional DC-DC converter is operated in a boost mode, a switching duty cycle of a voltage clamping switch provided on the low voltage side is reduced to allow lowering a capacitance of a voltage clamping capacitor. Accordingly, the control method is successful in enhancing the power conversion efficiency and reducing the manufacturing cost.

The control method for the bidirectional DC-DC converter in accordance with an aspect of the present invention includes:

operating the bidirectional DC-DC converter in a boost mode, with the bidirectional DC-DC converter including a high voltage side and a low voltage side, and with the low voltage side provided with a plurality of low-voltage-side switches, a voltage clamping switch and a voltage clamping capacitor;

switching the voltage clamping switch with a predetermined duty cycle;

with the predetermined duty cycle of the voltage clamping switch smaller than a turn-off time of the low-voltage-side switches to reduce a period of charging/discharging time of the voltage clamping capacitor with a capacitance and a charging/discharging current of the voltage clamping capacitor reduced.

Another objective of this invention is to provide a control method for bidirectional DC-DC converters. The bidirectional DC-DC converter includes a high voltage side and a low voltage side. When the bidirectional DC-DC converter is operated in a buck mode, a duty cycle of low-voltage-side switches extend to overlap the turn-off time of high-voltage-side switches to reduce the conduction loss of the low-voltage-side switches. Accordingly, the control method is successful in reducing the conduction loss of the low-voltage-side switches and enhancing the power conversion efficiency.

The control method for the bidirectional DC-DC converter in accordance with an aspect of the present invention includes:

operating the bidirectional DC-DC converter in a buck mode, with the bidirectional DC-DC converter including a high voltage side and a low voltage side, with the high voltage side provided with a plurality of high-voltage-side switches, and with the low voltage side provided with a plurality of low-voltage-side switches;

adjusting and extending a duty cycle of the low-voltage-side switches to overlap a turn-off time of the high-voltage-side switches;

with the conduction loss of the low-voltage-side switches reduced by extending the duty cycle of the low-voltage-side switches.

Another primary objective of this invention is to provide a control method for bidirectional DC-DC converters. The bidirectional DC-DC converter includes a high voltage side and a low voltage side. When the bidirectional DC-DC converter is operated in a boost mode, a voltage clamping switch provided on the low voltage is operated with a duty cycle prior to all of the low-voltage-side switches, and the duty cycle of the voltage clamping switch is smaller than a turn-off time of the low-voltage-side switches to allow lowering a capacitance of a voltage clamping capacitor. Accordingly, the control method is successful in enhancing the power conversion efficiency and reducing the manufacturing cost. When the bidirectional DC-DC converter is operated in a buck mode, the duty cycle of the low-voltage-side switches extend to overlap the turn-off time of high-voltage-side switches to reduce the conduction loss of the low-voltage-side switches. Accordingly, the control method is successful in reducing the conduction loss of the low-voltage-side switches and enhancing the power conversion efficiency.

The control method for the bidirectional DC-DC converter in accordance with an aspect of the present invention includes:

operating the bidirectional DC-DC converter in a boost mode, with the bidirectional DC-DC converter including a high voltage side and a low voltage side, with the high voltage side provided with a plurality of high-voltage-side switches, and with the low voltage side provided with a plurality of low-voltage-side switches, a voltage clamping switch and a voltage clamping capacitor;

switching the voltage clamping switch with a predetermined duty cycle;

with the predetermined duty cycle of the voltage clamping switch smaller than a turn-off time of the low-voltage-side switches to reduce a period of charging/discharging time of the voltage clamping capacitor with a capacitance and a charging/discharging current of the voltage clamping capacitor reduced;

operating the bidirectional DC-DC converter in a buck mode; and adjusting and extending a duty cycle of the low-voltage-side switches to overlap a turn-off time of the high-voltage-side switches;

with the conduction loss of the low-voltage-side switches reduced.

In a separate aspect of the present invention, the low-voltage-side switch is selected from a low-voltage withstand switch.

In a further separate aspect of the present invention, the high-voltage-side switch is selected from a high-voltage withstand switch.

In yet a further separate aspect of the present invention, the voltage clamping capacitor is selected from a low-capacitance element.

In yet a further separate aspect of the present invention, the duty cycle of the low-voltage-side switches extends to overlap a turn-off time of the high-voltage-side switches.

Further scope of the applicability of the present invention will become apparent from the detailed description given hereinafter. However, it should be understood that the detailed description and specific examples, while indicating preferred embodiments of the invention, are given by way of illustration only, since various modifications will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

It is noted that a control method in accordance with the preferred embodiment of the present invention can be applicable to various bidirectional DC-DC converters, for example: a current-fed boost type converter, which is not limitative of the present invention.

Figure 1:
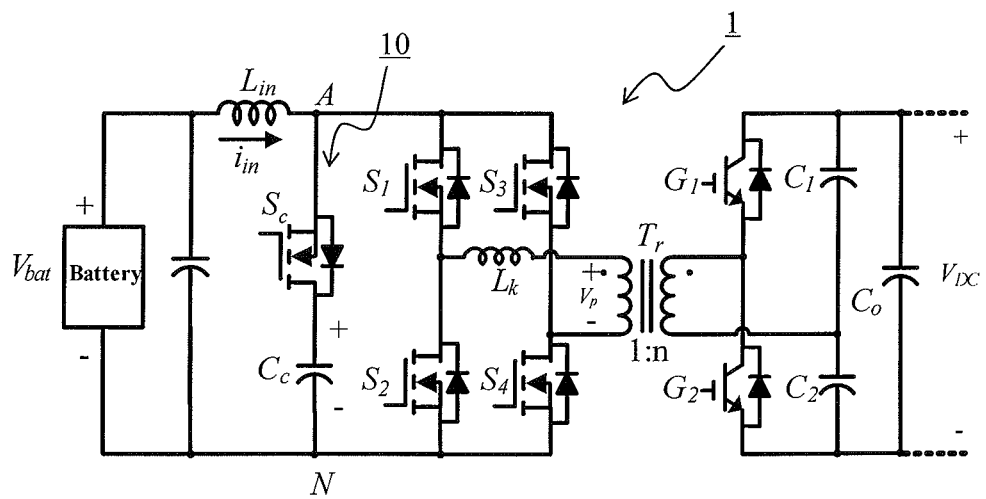
FIG. 1 is a schematic diagram of a bidirectional DC-DC converter applied in a control method in accordance with a preferred embodiment of the present invention.

FIG. 1 shows a schematic diagram of a bidirectional DC-DC converter applied in a control method in accordance with the preferred embodiment of the present invention. Referring to FIG. 1, the bidirectional DC-DC converter 1 includes a transformer which includes a low voltage side (left side) and a high voltage side (right side). The low-voltage side has an inductor $L_{in}$, a plurality of low-voltage-side switches S1, S2, S3, S4, a plurality of diodes reversely parallel-connected with the low-voltage-side switches S1, S2, S3, S4, a voltage clamping switch Sc and a voltage clamping capacitor Cc. The voltage clamping switch Sc and the voltage clamping capacitor Cc are connected to form a voltage clamping circuit 10. The low-voltage-side switches S1, S2, S3, S4 are connected to form a full-bridge converter. Preferably, the low-voltage-side switches S1, S2, S3, S4 are selected from a low-voltage withstand switch. Correspondingly, the high-voltage side has a plurality of high-voltage-side switches G1, G2, a plurality of diodes reversely parallel-connected with the high-voltage-side switches G1, G2 and a plurality of capacitors C0, C1, C2. The high-voltage-side switches G1, G2 and the capacitors C1, C2 are connected to form a half-bridge converter. Preferably, the high-voltage-side switches G1, G2 are selected from a high-voltage withstand switch.

Figure 2:
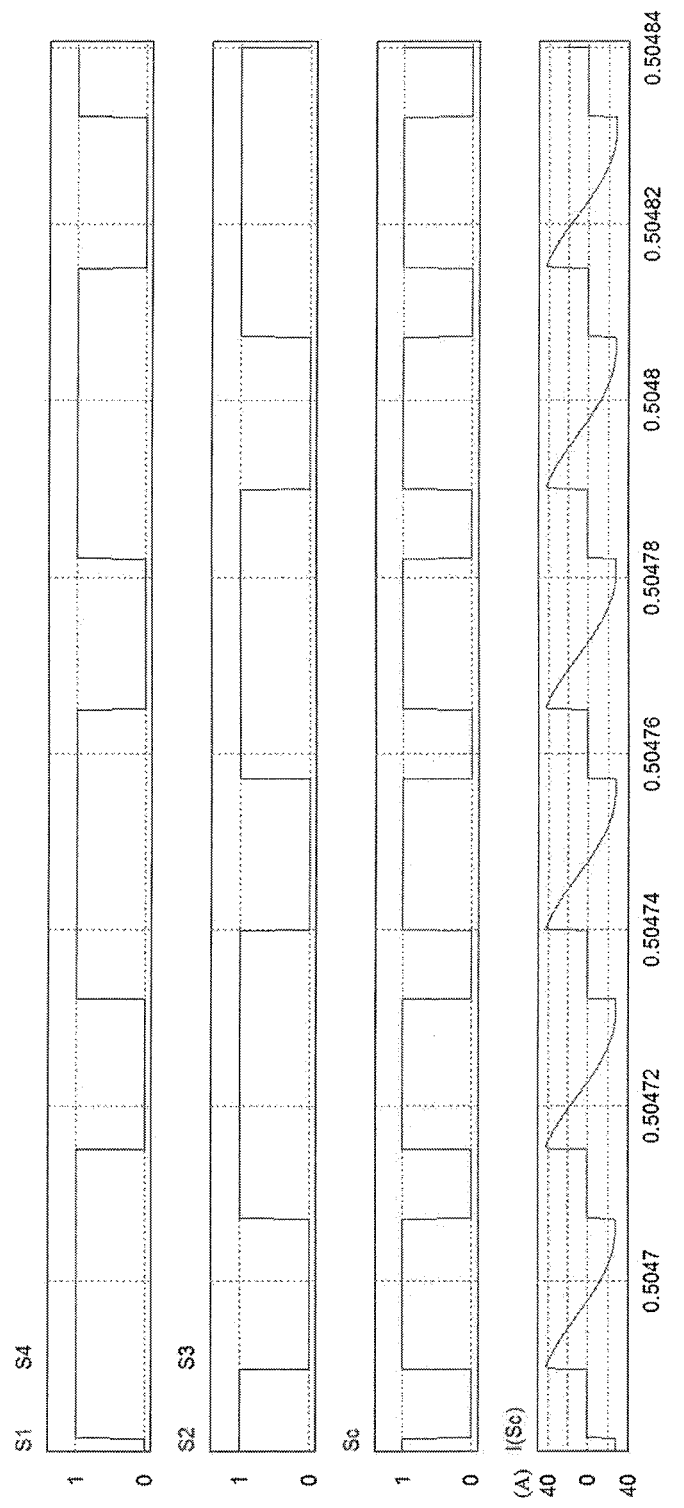
FIG. 2 is a series of waveform diagrams of driving signals of low-voltage-side switches, and a driving signal and a conduction current of voltage clamping switch applied to the bidirectional DC-DC converter, depicted in FIG. 1, prior to executing the control method in accordance with the preferred embodiment of the present invention.

FIG. 2 shows a series of waveform diagrams of driving signals of low-voltage-side switches, and a driving signal and a conduction current of voltage clamping switch applied to the bidirectional DC-DC converter prior to executing the control method in accordance with the preferred embodiment of the present invention. Referring now to FIGS. 1 and 2, when the bidirectional DC-DC converter 1 is operated in a boost mode, the driving signals of the low-voltage-side switches S1, S4 are identical, and the driving signals of the other low-voltage-side switches S2, S3 are identical. When two switches (S1 and S4) or (S2 and S3) of the low-voltage-side switches are switched off, the voltage clamping switch Sc is conducted, as best shown in the first to third waveforms of FIG. 2. Once the two switches (S1 and S4) or (S2 and S3) of the low-voltage-side switches are switched off and the voltage clamping switch Sc is conducted, the voltage clamping capacitor Cc connects with the full-bridge converter of the low-voltage-side switches S1, S2, S3, S4 in parallel via the voltage clamping switch Sc and a reversely parallel-connected diode for clamping the voltages of the low-voltage-side switches S1, S2, S3, S4. Accordingly, the low-voltage-side switches S1, S2, S3, S4 can avoid over-voltage while turning off. Meanwhile, the voltage clamping capacitor Cc starts to store the power energy which will be discharged to the leakage inductor of the transformer via the voltage clamping switch Sc. Advantageously, the low-voltage-side switches S1, S2, S3, S4 can be successfully switched on by a zero-voltage switching operation. However, once the duty cycle of the voltage clamping switch Sc is enlarged, there exists a relative increase of the conduction current I(Sc) of the voltage clamping switch Sc which results in a higher degree of conduction loss not only in the voltage clamping switch Sc but also in the low-voltage-side switches S1, S2, S3, S4, as best shown in the fourth waveform of FIG. 2. In order to avoid the conduction loss, the control method of the present invention adopts reducing the duty cycle of the voltage clamping switch Sc.

Figure 3:
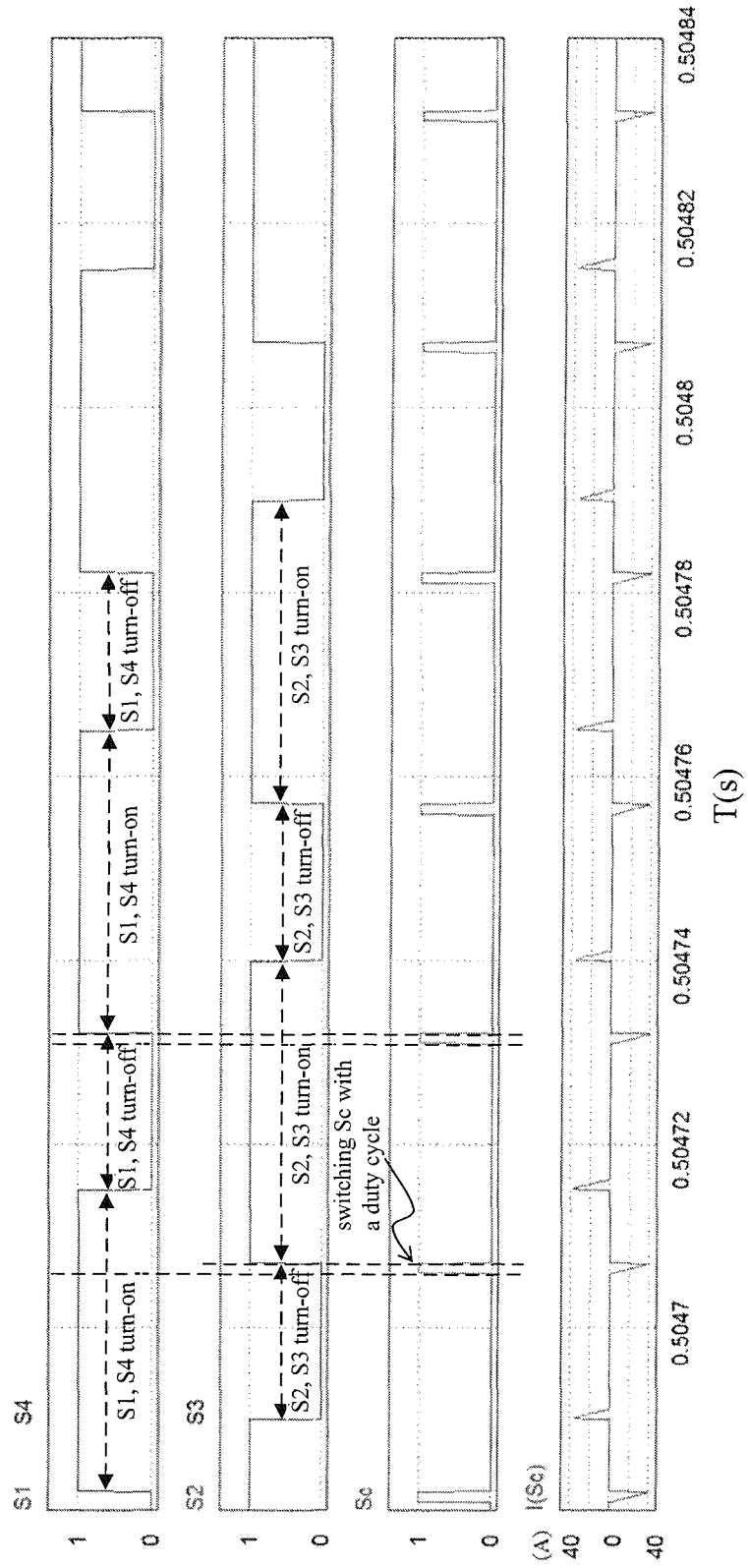
FIG. 3 is a series of waveform diagrams of driving signals of low-voltage-side switches, and a driving signal and a conduction current of voltage clamping switch of the bidirectional DC-DC converter, in a boost mode, operated in the control method in accordance with the first preferred embodiment of the present invention.

FIG. 3 shows a series of waveform diagrams, corresponding to those of FIG. 2, of driving signals of low-voltage-side switches, and a driving signal and a conduction current of voltage clamping switch of the bidirectional DC-DC converter, in a boost mode, operated in the control method in accordance with the first preferred embodiment of the present invention. At the transient moment of turning off the two switches (S1 and S4) or (S2 and S3) of the low-voltage-side switches, the voltage clamping capacitor Cc is arranged to clamp the voltages of the low-voltage-side switches S1, S2, S3, S4 via the reversely parallel-connected diode of the voltage clamping switch Sc which is situated in a turn-off state. In order to discharge the power energy of the voltage clamping capacitor Cc and to successfully switch on the low-voltage-side switches S1, S2, S3, S4 by a zero-voltage switching operation, switching on the voltage clamping switch Sc must occur prior to switching on all of the low-voltage-side switches S1, S2, S3, S4. Thus, the duty cycle of the voltage clamping switch Sc is allowed to be reduced.

Referring now to FIGS. 1 and 3, in the first embodiment of the present invention, the predetermined duty cycle of the voltage clamping switch Sc is reduced, as best shown in the arrows of FIG. 3. In operation, the voltage clamping switch Sc is only switched on prior to switching on all of the low-voltage-side switches S1, S2, S3, S4. The predetermined duty cycle of the voltage clamping switch Sc is smaller than a turn-off time of the two switches (S1 and S4) or (S2 and S3) of the low-voltage-side switches, as best shown in the first to third waveforms of FIG. 3. Accordingly, this results in a smaller conduction current I(Sc) of the voltage clamping switch Sc and in reduction of the conduction loss of the low-voltage-side switches S1, S2, S3, S4 and the voltage clamping switch Sc, as best shown in the fourth waveform of FIG. 3.

With continued reference to FIGS. 1 and 3, due to the reduction of the duty cycle of the voltage clamping switch Sc and the reduction of a period of charging/discharging time of the voltage clamping capacitor Cc, a charging/discharging current of the voltage clamping capacitor Cc is reduced. Advantageously, the conduction loss of the low-voltage-side switches S1, S2, S3, S4 and the voltage clamping switch Sc are reduced. Accordingly, the bidirectional DC-DC converter 1 of the first embodiment of the present invention is allowed to select the voltage clamping capacitor Cc from a low-capacitance element which will reduce the dimensions and the manufacturing cost of the bidirectional DC-DC converter 1.

Figure 4:
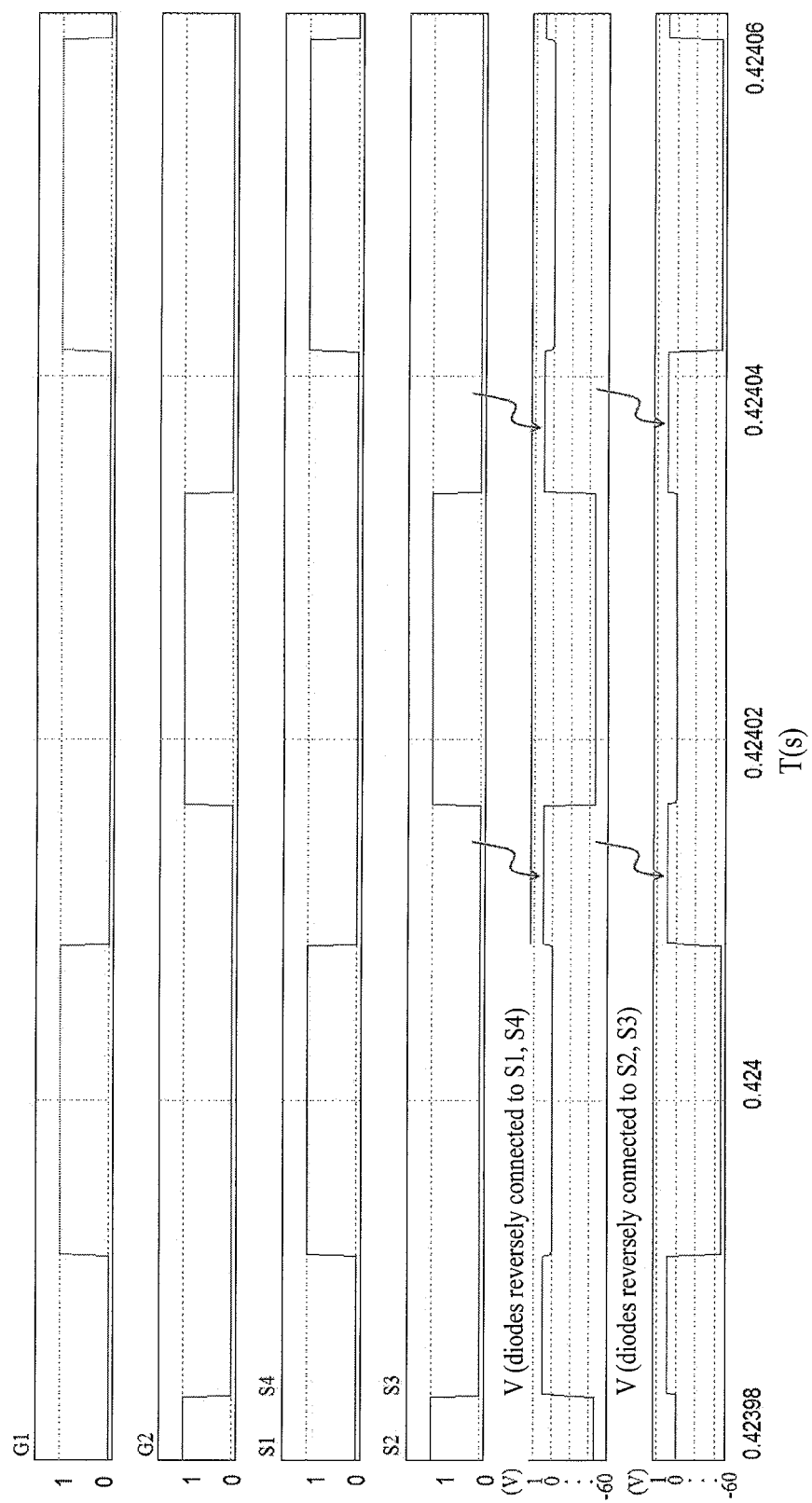
FIG. 4 is a series of waveform diagrams of driving signals of high-voltage-side switches and low-voltage-side switches, and voltages of reversely parallel-connected diodes of low-voltage-side switches applied to the bidirectional DC-DC converter, depicted in FIG. 1, prior to executing the control method in accordance with the preferred embodiment of the present invention.

FIG. 4 shows a series of waveform diagrams of driving signals of high-voltage-side switches and low-voltage-side switches, and voltages of reversely parallel-connected diodes of low-voltage-side switches applied to the bidirectional DC-DC converter prior to executing the control method in accordance with the preferred embodiment of the present invention. When the bidirectional DC-DC converter 1 is operated in a buck mode, the duty cycle of the high-voltage-side switches G1, G2 located at the high voltage side is smaller than 0.5, and the high-voltage-side switches G1, G2 are switched on in turn. When all of the low-voltage-side switches S1, S2, S3, S4 are switched off, currents will pass through the reversely parallel-connected diodes of the low-voltage-side switches S1, S2, S3, S4. However, the conduction voltage drop of the reversely parallel-connected diodes of the low-voltage-side switches S1, S2, S3, S4 is greater than the conduction voltage drop of the low-voltage-side switches S1, S2, S3, S4. Disadvantageously, this results in a greater conduction loss of the low voltage side of the bidirectional DC-DC converter 1. In order to reduce the conduction loss of the low voltage side, the bidirectional DC-DC converter 1 of the present invention must be operated by synchronous rectification technology. Since the conduction voltage drop of the low-voltage-side switches S1, S2, S3, S4 is smaller than the conduction voltage drop of the reversely parallel-connected diodes, it can reduce the conduction loss of the low voltage side by suitably switching on the low-voltage-side switches S1, S2, S3, S4. Advantageously, the bidirectional DC-DC converter 1 allows the currents to pass through the low-voltage-side switches 51, S2, S3, S4 rather than the reversely parallel-connected diodes.

Referring now to FIGS. 1 and 4, in synchronous rectification operation, when the high-voltage-side switch G1 is switched on, the low-voltage-side switches S1, S4 must be synchronously switched on for rectification, as best shown in the first and fourth waveforms of FIG. 4. Correspondingly, when the high-voltage-side switch G2 is switched on, the low-voltage-side switches S2, S3 must be synchronously switched on for rectification, as best shown in the second and third waveforms of FIG. 4. However, when the high-voltage-side switches G1, G2 are switched off, all of the low-voltage-side switches S1, S2, S3, S4 are also switched off, which is called a "fly-wheel mode." In the fly-wheel mode, the reversely parallel-connected diodes of the low-voltage-side switches S1, S2, S3, S4 are synchronously conducted, as best shown in arrows in FIG. 4, and a conduction voltage drop of the diodes higher than that of the low-voltage-side switches S1, S2, S3, S4 will occur, as best shown in the fifth and sixth waveforms of FIG. 4. Disadvantageously, it results in a greater conduction loss of the low voltage side of the bidirectional DC-DC converter 1.

Figure 5:
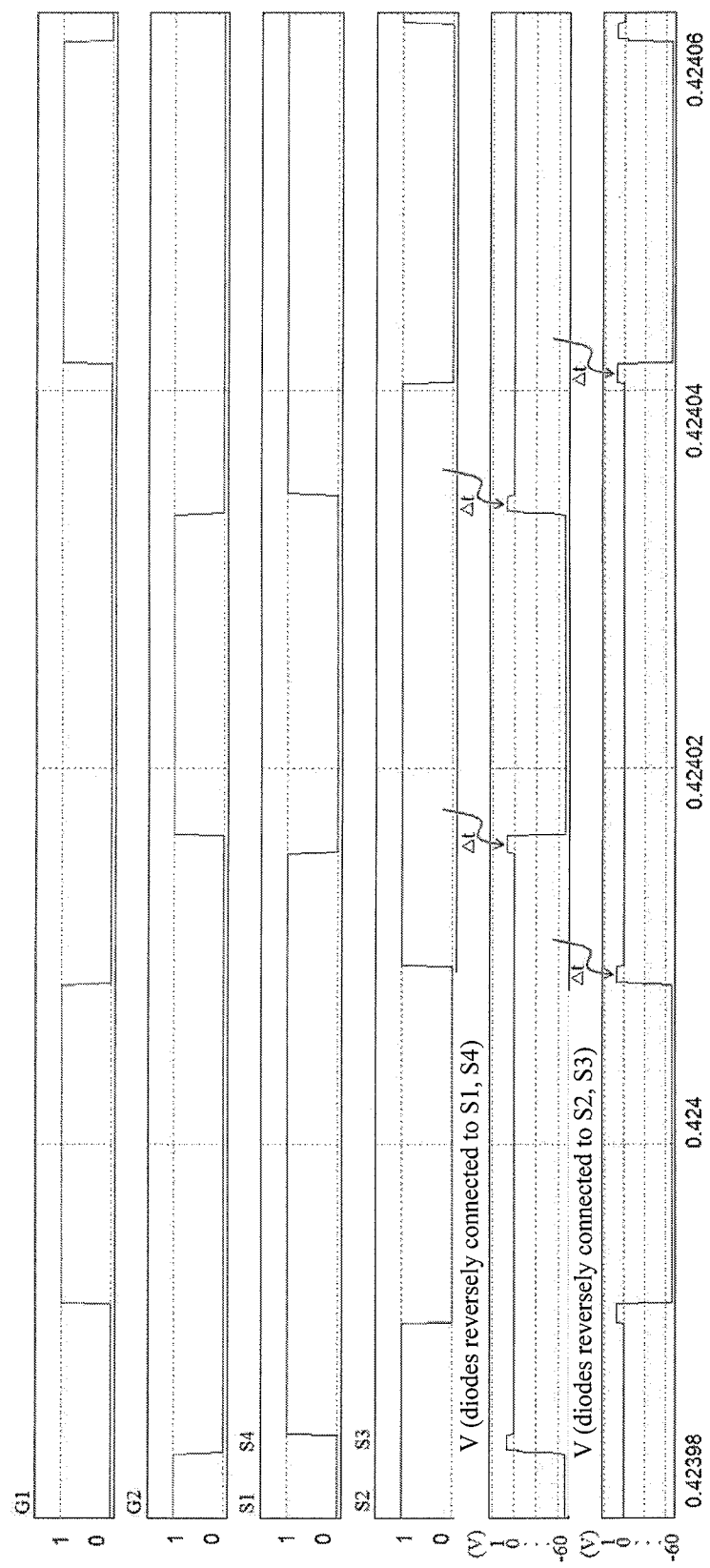
FIG. 5 is a series of waveform diagrams of driving signals of high-voltage-side switches and low-voltage-side switches, and voltages of reversely parallel-connected diodes of low-voltage-side switches the bidirectional DC-DC converter, in a buck mode, operated in the control method in accordance with the second preferred embodiment of the present invention.

FIG. 5 shows a series of waveform diagrams, corresponding to those of FIG. 4, of driving signals of high-voltage-side switches and low-voltage-side switches, and voltages of reversely parallel-connected diodes of low-voltage-side switches of the bidirectional DC-DC converter, in a buck mode, operated in the control method in accordance with the second preferred embodiment of the present invention. Referring to FIGS. 1 and 5, in the second embodiment of the present invention, the duty cycle of the high-voltage-side switches G1, G2 is smaller than and the high-voltage-side switches G1, G2 are switched on in turn. The relationship between the driving signals of the low-voltage-side switches S1, S2, S3, S4 located at the low voltage side of the bidirectional DC-DC converter 1 and the high-voltage-side switches G1, G2 located at the high voltage side of the bidirectional DC-DC converter 1 creates a predetermined time $\Delta t$ of advance time or time delay. Namely, there exists an advance time interval or a delay time interval for conducting the low-voltage-side switches S1, S2, S3, S4 with respect to the high-voltage-side switches G1, G2. Accordingly, the bidirectional DC-DC converter 1 can avoid conducting all of the low-voltage-side switches S1, S2, S3, S4 which will cause problems of short circuit while the high-voltage-side switches G1, G2 are conducted.

When the high-voltage-side switch G1 is switched off, the low-voltage-side switches S2, S3 will be switched on by delayed action with a predetermined delay time∆t in which the current of the low voltage side will pass through the reversely parallel-connected diodes of the low-voltage-side switches S2, S3, as best shown in the arrows in FIG. 5. After the predetermined delay time∆t, the current of the low voltage side will be changed to pass through the low-voltage-side switches S2, S3, as best shown in the first, fourth and sixth waveforms of FIG. 5.

Conversely, when switching on the high-voltage-side switch G1, the low-voltage-side switches S2, S3 will be switched off early with a predetermined advance time∆t in which the current of the low voltage side will pass through the reversely parallel-connected diodes of the low-voltage-side switches S2, S3, as best shown in the arrows in FIG. 5. Before the predetermined advance time∆t, the current of the low voltage side will pass through the low-voltage-side switches S2, S3, as best shown in the first, fourth and sixth waveforms of FIG. 5.

When the high-voltage-side switch G2 is switched off, the low-voltage-side switches S1, S4 will be switched on by delayed action with the predetermined delay time∆t in which the current of the low voltage side will pass through the reversely parallel-connected diodes of the low-voltage-side switches S1, S4, as best shown in arrows in FIG. 5. After the predetermined delay time∆t, the current of the low voltage side will be changed to pass through the low-voltage-side switches S1, S4, as best shown in the second, third and fifth waveforms of FIG. 5.

Conversely, when switching on the high-voltage-side switch G2, the low-voltage-side switches S1, S4 will be switched off early with a predetermined advance time∆t in which the current of the low voltage side will pass through the reversely parallel-connected diodes of the low-voltage-side switches S1, S4, as best shown in the arrows in FIG. 5. Before the predetermined advance time∆t, the current of the low voltage side will pass through the low-voltage-side switches S1, S4, as best shown in the second, third and fifth waveforms of FIG. 5.

Since the current of the low voltage side, only within the predetermined delay time∆t, will pass through the reversely parallel-connected diodes of the low-voltage-side switches S1, S2, S3, S4, as best shown in the fifth and sixth waveforms of FIG. 5, it will effectively reduce the conduction loss of the diodes. When the high-voltage-side switch G1 or G2 is switched off, the low-voltage-side switches (S2, S3) or (S1, S4) are switched on with the predetermined delay time∆t, such that the current of the low voltage side will pass through the reversely parallel-connected diodes of the low-voltage-side switches (S2, S3) or (S1, S4) only within the predetermined delay time∆t.

Furthermore, since the current of the low voltage side, only within the predetermined advance time∆t, will pass through the reversely parallel-connected diodes of the low-voltage-side switches S1, S2, S3, S4, as best shown in the fifth and sixth waveforms of FIG. 5, it will effectively reduce the conduction loss of the diodes. When the high-voltage-side switch G1 or G2 is conducted, the low-voltage-side switches (S2, S3) or (S1, S4) are switched off early with the predetermined advance time∆t, such that the current of the low voltage side will pass through the reversely parallel-connected diodes of the low-voltage-side switches (S2, S3) or (S1, S4) only within the predetermined advance time∆t.

Referring again to FIG. 5, in adjusting operation, the duty cycle of the low-voltage-side switches S1, S2, S3, S4 extends to overlap the turn-off time interval of the high-voltage-side switches G1, G2, such that the control method is successful in reducing the conduction loss of the low-voltage-side switches S1, S2, S3, S4. For example, the duty cycle of the low-voltage-side switches S1, S4 (peaks of the third waveform of FIG. 5) is adjusted to extend and thus to overlap at least one part of the turn-off time interval of the high-voltage-side switches G1 (troughs of the first waveforms of FIG. 5). Also, the duty cycle of the low-voltage-side switches S2, S3 (peaks of the fourth waveform of FIG. 5) is adjusted to extend and thus to overlap at least one part of the turn-off time interval of the high-voltage-side switches G2 (troughs of the second waveform of FIG. 5).

It will be understood that the control methods of the first and second preferred embodiments are combined to provide two functions of the present invention. In a preferred embodiment, the bidirectional DC-DC converter 1 is selectively operated in the boost or buck mode by the control method of the first or second preferred embodiment.

Although the invention has been described in detail with reference to its presently preferred embodiments, it will be understood by one of ordinary skill in the art that various modifications can be made without departing from the spirit and the scope of the invention, as set forth in the appended claims.

What is claimed is:

1. A control method comprising:
operating a bidirectional DC-DC converter in a boost mode, with the bidirectional DC-DC converter including a high voltage side and a low voltage side, with the low voltage side provided with a plurality of low-voltage-side switches, a voltage clamping switch and a voltage clamping capacitor, with the plurality of low-voltage-side switches including a plurality of first low-voltage-side switches and a plurality of second low-voltage-side switches;
alternatively switching on and off the plurality of first low-voltage-side switches and the plurality of second low-voltage-side switches including cutting off the plurality of first low-voltage-side switches or the plurality of second low-voltage-side switches and utilizing the voltage clamping capacitor to clamp a voltage via a diode reversely parallel-connected to the voltage clamping switch situated in a cut-off state, with switching on the voltage clamping switch prior to switching on all of the plurality of low-voltage-side switches to discharge power energy of the voltage clamping capacitor and to switch on the plurality of first low-voltage-side switches or the plurality of second low-voltage-side switches by a zero-voltage switching operation, thereby reducing a duty cycle of switching the voltage clamping switch; and
switching on the voltage clamping switch with a predetermined duty cycle with a switching-on time interval at a first point of a turn-off time interval of at least one set of the plurality of low-voltage-side switches prior to nearly switching on all of the plurality of low-voltage-side switches and switching off the voltage clamping switch at a second point prior to alternatively switching on the at least one set of the plurality of low-voltage-side switches;
wherein the switching-on time interval of the voltage clamping switch is smaller than a turn-off time interval and a period of charging and discharging time of the voltage clamping capacitor is reduced due to reduction of the duty cycle of switching the voltage clamping switch.

2. The control method as defined in claim 1, wherein the voltage clamping capacitor is selected from a low-capacitance element.

3. The control method as defined in claim 1, wherein at least one of the plurality of low-voltage-side switches is a low-voltage withstand switch.

4. A control method comprising:
operating a bidirectional DC-DC converter in a buck mode, with the bidirectional DC-DC converter including a high voltage side and a low voltage side, with the high voltage side provided with a plurality of high-voltage-side switches including a first high-voltage-side switch and a second high-voltage-side switch, and with the low voltage side provided with a plurality of low-voltage-side switches including a plurality of first low-voltage-side switches and a plurality of second low-voltage-side switches; and adjusting a conducting time interval of the plurality of low-voltage-side switches with a first PWM duty cycle to overlap a turn-off time interval of the plurality of high-voltage-side switches with a second PWM duty cycle of less than 0.5, and containing the conducting time interval of the plurality of low-voltage-side switches within the turn-off time interval of the plurality of high-voltage-side switches;

with the first high-voltage-side switch switched off, the plurality of second low-voltage-side switches are switched on by a delayed action with a first predetermined delay time in which a current of a low voltage side passes through second diodes reversely parallel-connected to the plurality of second low-voltage-side switches;

with the first high-voltage-side switch switched on, the plurality of second low-voltage-side switches are switched off early with a first predetermined advance time in which the current of the low voltage side passes through the second diodes reversely parallel-connected to the plurality of second low-voltage-side switches;

with the second high-voltage-side switch switched off, the plurality of first low-voltage-side switches are switched on by a delayed action with a second predetermined delay time in which the current of the low voltage side passes through first diodes reversely parallel-connected to the plurality of first low-voltage-side switches;

with the second high-voltage-side switch switched on, the plurality of first low-voltage-side switches are switched off early with a second predetermined advance time in which the current of the low voltage side passes through the first diodes reversely parallel-connected to the plurality of first low-voltage-side switches; and wherein conduction loss of the plurality of low-voltage-side switches is reduced by the conducting time interval of the plurality of low-voltage-side switches with the first PWM duty cycle.

5. The control method as defined in claim 4, wherein a predetermined time of advance time or time delay is arranged in a relationship between driving signals of the plurality of low-voltage-side switches and the plurality of high-voltage-side switches, wherein an advance time interval or a delay time interval for conducting the plurality of low-voltage-side switches with respect to the plurality of high-voltage-side switches avoids conducting all of the plurality of low-voltage-side switches causing a short circuit while the plurality of high-voltage-side switches are conducted.

6. The control method as defined in claim 4, wherein driving signals of a first and a second of four of the plurality of low-voltage-side switches are identical, while driving signals of a third and a fourth of the four of the plurality of low-voltage-side switches are identical.

7. The control method as defined in claim 4, wherein a boundary of the conducting time interval of the plurality of low-voltage-side switches is adjacent to at least one boundary part of the turn-off time interval of the plurality of high-voltage-side switches.

8. The control method as defined in claim 4, wherein at least one of the plurality of low-voltage-side switches is a low-voltage withstand switch.

9. The control method as defined in claim 4, wherein at least one of the high-voltage-side switches is a high-voltage withstand switch.

10. A control method comprising:
operating a bidirectional DC-DC converter in a boost mode, with the bidirectional DC-DC converter including a high voltage side and a low voltage side, with the high voltage side provided with a plurality of high-voltage-side switches including a first high-voltage-side switch and a second high-voltage-side switch, and with the low voltage side provided with a plurality of low-voltage-side switches including a plurality of first low-voltage-side switches and a plurality of second low-voltage-side switches, a voltage clamping switch and a voltage clamping capacitor;

alternatively switching on and off the plurality of first low-voltage-side switches and the plurality of second low-voltage-side switches including with cutting off the plurality of first low-voltage-side switches or the plurality of second low-voltage-side switches and utilizing the voltage clamping capacitor to clamp a voltage via a diode reversely parallel-connected to the voltage clamping switch situated in a cut-off state, with switching on the voltage clamping switch prior to switching on all of the plurality of low-voltage-side switches to discharge power energy of the voltage clamping capacitor and to switch on the plurality of first low-voltage-side switches or the plurality of second low-voltage-side switches by a zero-voltage switching operation, thereby reducing a duty cycle of switching the voltage clamping switch;

switching on the voltage clamping switch with a switching-on time interval prior to switching on all of the plurality of low-voltage-side switches;

adjusting the switching-on time interval of the voltage clamping switch to be smaller than a turn-off time interval of the plurality of low-voltage-side switches, wherein a period of charging and discharging time of the voltage clamping capacitor is reduced due to reduction of the duty cycle of switching the voltage clamping switch;

or, operating the bidirectional DC-DC converter in a buck mode; and adjusting conducting time interval of the plurality of low-voltage-side switches with a first PWM duty cycle to overlap a turn-off time interval of the plurality of high-voltage-side switches with a second PWM duty cycle of less than 0.5, and containing the conducting time interval of the plurality of low-voltage-side switches within the turn-off time interval of the plurality of high-voltage-side switches;

with the first high-voltage-side switch switched off, the plurality of second low-voltage-side switches are switched on by a delayed action with a first predetermined delay time in which a current of a low voltage side passes through second diodes reversely parallel-connected to the plurality of second low-voltage-side switches;

with the first high-voltage-side switch switched on, the plurality of second low-voltage-side switches are switched off early with a first predetermined advance time in which the current of the low voltage side passes through the second diodes reversely parallel-connected to the plurality of second low-voltage-side switches;

with the second high-voltage-side switch switched off, the plurality of first low-voltage-side switches are switched on by a delayed action with a second predetermined delay time in which the current of the low voltage side passes through first diodes reversely parallel-connected to the plurality of first low-voltage-side switches;

with the second high-voltage-side switch switched on, the first low-voltage-side switches are switched off early with a second predetermined advance time in which the current of the low voltage side passes through the first diodes reversely parallel-connected to the plurality of first low-voltage-side switches; and wherein conduction loss of the plurality of low-voltage-side switches are reduced by adjusting the conducting time interval of the plurality of low-voltage-side switches with the first PWM duty cycle.

11. The control method as defined in claim 10, wherein the voltage clamping capacitor is selected from a low-capacitance element.

12. The control method as defined in claim 10, wherein in the buck mode, a predetermined time of advance time or time delay is arranged in a relationship between driving signals of the plurality of low-voltage-side switches and the plurality of high-voltage-side switches, wherein an advance time interval, a delay time interval, or both for conducting the plurality of low-voltage-side switches with respect to the plurality of high-voltage-side switches avoids conducting all of the plurality of low-voltage-side switches causing a short circuit while the plurality of high-voltage-side switches are conducted.

13. The control method as defined in claim 10, wherein in the buck mode, driving signals of a first and a second of four of the plurality of low-voltage-side switches are identical, while driving signals of a third and a fourth of the four of the plurality of low-voltage-side switches are identical.

14. The control method as defined in claim 10, wherein in the buck mode, a boundary of the conducting time interval of the plurality of low-voltage-side switches is adjacent to at least one boundary part of the turn-off time interval of the plurality of high-voltage-side switches.

15. The control method as defined in claim 10, wherein at least one of the plurality of low-voltage-side switches is a low-voltage withstand switch.

16. The control method as defined in claim 10, wherein at least one of the plurality of high-voltage-side switches is a high-voltage withstand switch.

17. The control method as defined in claim 10, wherein in the boost mode, switching on the voltage clamping switch with a predetermined duty cycle with a switching-on time interval at a first point of the turn-off time interval of at least one set of the plurality of low-voltage-side switches prior to nearly switching on all of the plurality of low-voltage-side switches and switching off the voltage clamping switch occurs at a point prior to alternatively switching on the at least one set of the plurality of low-voltage-side switches.

* * * * *